April 19, 1960     A. K. DURFEE     2,932,995

WORK HOLDING APPARATUS

Filed Nov. 25, 1957

INVENTOR.
ALLEN K. DURFEE
BY Elliott & Pastoriza
ATTORNEYS

United States Patent Office 2,932,995
Patented Apr. 19, 1960

2,932,995

WORK HOLDING APPARATUS

Allen K. Durfee, Culver City, Calif.

Application November 25, 1957, Serial No. 698,590

7 Claims. (Cl. 77—62)

This invention relates generally to holding devices for locating and holding in desired positions work or parts upon which machining operations are to be performed.

Jigs, fixtures, and other holding devices for properly locating and positioning work are well known in the art. No problem is generally encountered in the proper locating and positioning of parts formed mostly of plane surfaces such as blocks, triangular shaped elements, or other shapes involving squares, rectangles, and the like. Many machine parts, however, are cylindrical or tubular in shape or of some other curved design, few of which can be adequately located or properly held with presently available fixtures. In cases where round surfaces characterize the particular work or part, it is usually necessary to construct a special holder. When the part includes compound curves or different diameter portions, the construction of a suitable jig becomes extremely complicated and costly.

Bearing the above in mind, it is a primary object of the present invention to provide a novel work holding apparatus capable of locating and holding round, cylindrical, tubular, hexagonal, and similarly shaped work or parts in a desired secured position on a machine tool table to enable a series of machining operations to be readily performed on the work in a consistent manner.

More particularly, it is an object to provide a universal work holding apparatus of the above type which includes removable side and end adapter blank holders as well as various dimensioned adapter blanks for co-operation therewith to the end that substantially any particularly shaped work may be adequately supported throughout its major dimensions.

Another object is to provide a holding apparatus including combinational components which are extremely simple to assemble and will retain their predetermined set-up positions so that consistency in assembly line machining operations is insured.

Still another object of the invention is to provide a work holding device of the above type which may serve as a final inspection check fixture to insure the consistency of dimensions on a particular work or part.

These and many other objects and advantages of the present invention are attained, briefly, by providing a basic integral block having a longitudinal V cut and at least one transverse channel cut to define opposing inclined seating surfaces on opposite sides of the longitudinal axis of the block. The V cut itself serves as an excellent seating means for rounded work or parts and constitutes the primary support therefor. Surface plate means are provided and are adapted to be seated on the seating surfaces to build up opposing portions thereof so that work of different diameter sections may be properly engaged within the V cut. There is also preferably included as a part of the work holding apparatus at least one side and bottom adapter holder as well as an end adapter plate arranged to co-operate with various adapter blanks so that almost any desired seating surface configuration may be constructed and adapted to the particular work or part under consideration.

The basic integral block as well as the side and end adapter blank holders are provided with suitable locating and securing holes so that once a set-up is established, all parts may be securely locked in place. In addition to the side and end adapter blank holders, there may also be provided suitable drill plates securable to the top surface of the basic block for guiding drilling operations on a work engaged within the V cut of the block.

A better understanding of the invention and its various features and advantages will be had by referring to the accompanying drawings, in which.

Figures 1, 2, 3:
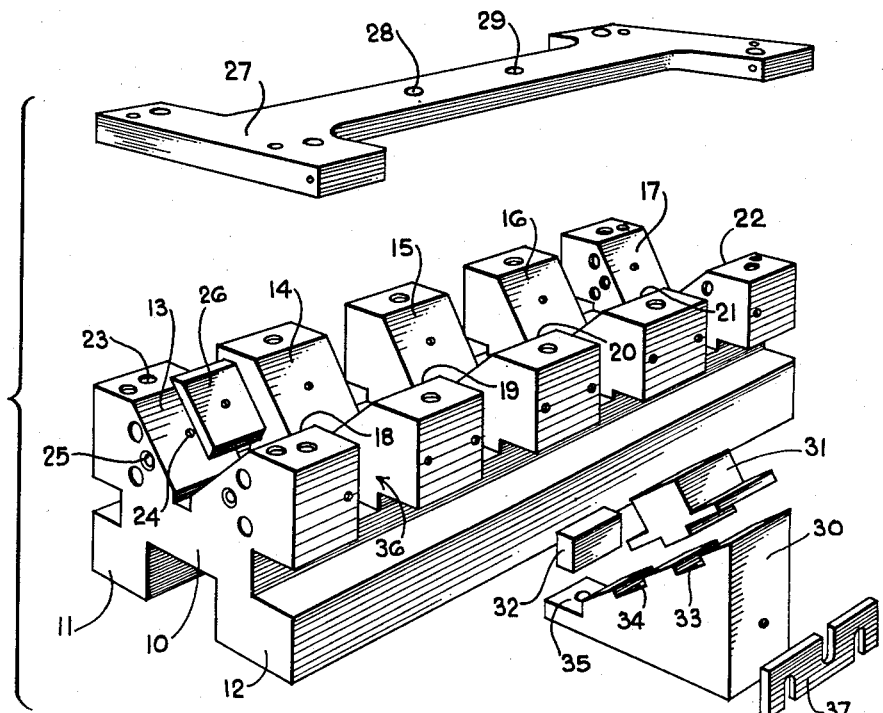
Figure 1 is an exploded perspective view of the basic integral block structure and some of the co-operating components usable therewith.
Figure 2 is another perspective exploded view of an end adapter plate and end adapter blank; and, Figure 3 illustrates in perspective view one example of the manner in which the work holding apparatus is arranged to locate and secure one type of work.

Referring first to Figure 1, there is shown a basic integral block 10 provided with lower side longitudinal grooves defining elongated feet 11 and 12 adapted to seat directly on the work table of a machine tool. The design is such that the block may be readily clamped in any desired position on the table.

The block itself includes a central longitudinal V cut and a series of transverse channel cuts to define a plurality of pairs of opposing inclined seating surfaces, one of the seating surfaces of each of the pairs forming a first row as indicated at 13, 14, 15, 16, and 17 on one side of the longitudinal axis of the block 10, and the other of the seating surfaces in each of the pairs constituting a second row 18, 19, 20, 21, and 22 on the opposite side of the longitudinal axis. The top portions of the various seating surfaces are provided with screw holes such as the screw hole 23 for the seating surface block portion 13 as well as inclined securing holes such as the hole 24 for the seating surface 13. Also, the block includes suitable end locating holes such as indicated at 25.

As shown, the various seating surfaces may be extended or built up by means of surface plates such as the plates 26 illustrated in an exploded position over the seating surface 13. Thus, by providing a suitable number of surface plates, the effective supporting area between opposing seating surfaces of the various pairs may be altered to accommodate different diameter portions on a work or part. The securement of the plate 26 to the seating surface 13 may be effected by means of a suitable machine screw passing into the screw opening 24.

As shown in the exploded portion of Figure 1 above the basic block 10, there is provided a drill plate 27 adapted to seat directly on top of the block and be secured thereto as by screws passing into the top openings. The drill plate itself may include suitable drill guide bores 28 and 29 accurately positioned in accordance with the desired spacing of drill holes to be machined into a work seated within the longitudinal V groove.

Also illustrated in Figure 1 is a side and bottom adapter holder 30 for holding side adapter blanks such as the blank 31 or bottom adapter blanks such as the blank 32 within specified positions in the longitudinal V cut. To facilitate the building up of the desired geometrical arrangement, the side adapter holder 30 may be provided with transverse grooves such as indicated at 33 and 34 and a leveled portion 35. By this arrangement, the various adapter blanks such as indicated at 31 and 32 may be properly seated and suitably secured to the adapter holder. The holder itself is arranged to slide within any one of the transverse channels such as channel 36 in the block 10. The securement of the side adapter holder 30 within the channel may be effected by means of a suitable bracket or clip 37 illustrated in exploded position.

Figure 2 shows an end adapter blank holder plate 38 constituting an important component part of the work holding apparatus. As shown, the plate 38 may be provided with suitable locating holes such as indicated at 39 for registration with the locating holes such as indicated at 25 on the near end portion on the block 10 of Figure 1. Alternatively, the plate may also be secured within any one of the channels. The end plate in the particular embodiment chosen for illustration may include a vertical slot 40 and a front channel 41 for receiving a suitable end adapter blank 42. The blank 42 may be vertically positioned with respect to the plate 38 as indicated by the two headed arrow, and the various parts locked together in their desired vertical relationship by means of a suitable bolt passing through the slot 40 and a co-operating hole 43 in the blank 42. By this arrangement, end portions of the work within the longitudinal V cut may be engaged for additional support. Alternatively, the blank such as the blank 42 may serve as a guide for a desired end machining operation.

The manner in which the work holding apparatus described in connection with Figures 1 and 2 operates, may best be understood by now referring to a specific example as illustrated in perspective view in Figure 3. In this example, the particular part to be supported constitutes a cylindrically shaped work having various diameter portions such as indicated at 44, 45, and 46.

As shown, the smaller diameter front portion 44 may be suitably supported within the front pair of opposing inclined seating surfaces by the use of surface plates such as 26 to build up the opposing inclined surfaces to a value which properly seats the diametric portion 44. In the case of the larger diameter central portion 45, the side adapter blank holder 30 is illustrated as secured within one of the transverse channels by the clip 37 and suitable screws. As shown, this adapter holder includes an adapter blank 47 for bearing support against the larger diameter portion 45 of the work.

The rear diametric portion of the work 46 is held between opposing seating surfaces provided with suitable surface plates to build up the surfaces to insure proper engagement of the work at its rear portion. As mentioned heretofore, in the event an end operation is to be performed on the work illustrated in Figure 3, the end adapter plate 38 could then be secured to the end of the transverse V cut of the block and the blank 42 or other type of end blank secured in a desired position to enable the particular end operation to be effected.

From the foregoing, it will be evident that many different types of parts or work may be supported by the basic components of the present invention. It will also be immediately evident to those skilled in the art that several differently dimensioned surface plates as well as side, bottom, and end adapter blanks may be provided so that any desired seating configuration for the particular work under consideration can be set up. In fact, these blanks are modular and may be machined or altered as required for any one particular application or job. Further, it will be evident that suitable riser blocks may be provided for proper spacing of overhead fixtures such as the drill plate 27 of Figure 1.

All such additions and modifications as fall within the scope and spirit of the basic invention will readily occur to those skilled in the art. Accordingly, while the invention has been described with respect to only the basic essential components, it will be appreciated that considerable variations can be effected. The invention is, therefore, not to be thought of as limited to the specific embodiment disclosed for illustrative purposes.

What is claimed is:

1. A work holding apparatus comprising: an integral block having a longitudinal V cut and at least one transverse channel cut to define opposing inclined seating surfaces on opposite sides of the longitudinal axis of said block; surface plate means coupled to said block and seated on said seating surfaces to build up opposing seating surfaces; at least one side and bottom adapter holder; means for securing said holder within said transverse channel cut; and side and bottom adapter blanks securable to said holder whereby a work having different diameter portions may have each said portions securely engaged within said V cut.

2. A work holding apparatus comprising: an integral block having a longitudinal V cut and at least one transverse channel cut to define opposing inclined seating surfaces on opposite sides of the longitudinal axis of said block; surface plate means coupled to said block and seated on said seating surfaces to build up opposing seating surfaces; at least one end adapter plate; means for securing said plate in a position to intercept said V cut; and end adapter blanks securable to said end adapter plate in a predetermined position with respect to a work engaged within said V groove, whereby said work may have different diameter portions with each portion thereof being securely engaged within said V cut.

3. A work holding apparatus comprising, in combination: an integral block having a longitudinal V cut and a plurality of transverse channel cuts to define a plurality of pairs of opposing inclined seating surfaces, one of the surfaces of each of said pairs forming a first row along one side of the longitudinal axis of said block and the other of the surfaces of each of said pairs forming a second row along the opposite side of said longitudinal axis; at least one side adapter holder dimensioned to slide within any one of said transverse channel cuts; and at least one end adapter plate secured to either end of said integral block and within any one of said transverse channel cuts.

4. The subject matter of claim 3 including drill plate means; and securing means for positioning said drill plate means on top of said block.

5. A work holding apparatus, according to claim 4, and at least one longitudinal U-shaped channel in the exterior sidewalls of said block.

6. A work holding apparatus according to claim 5, in which said integral block defines a pair of opposing U-shaped channels in the opposite sidewalls thereof.

7. A work holding apparatus according to claim 6, in which said block defines a longitudinal U-shaped channel in the bottom end thereof.

References Cited in the file of this patent
UNITED STATES PATENTS 2,164,455    Hart ------------------ July 4, 1939

FOREIGN PATENTS 326,021    Great Britain ---------- Mar. 6, 1930

OTHER REFERENCES

"A Drilling Jig for Round Stock," American Machinist magazine, page 305, Feb. 22, 1923.